Dec. 20, 1949     W. N. SMITH     2,491,777
STRIPPER TYPE COTTON HARVESTER
Filed Dec. 26, 1944     2 Sheets-Sheet 1
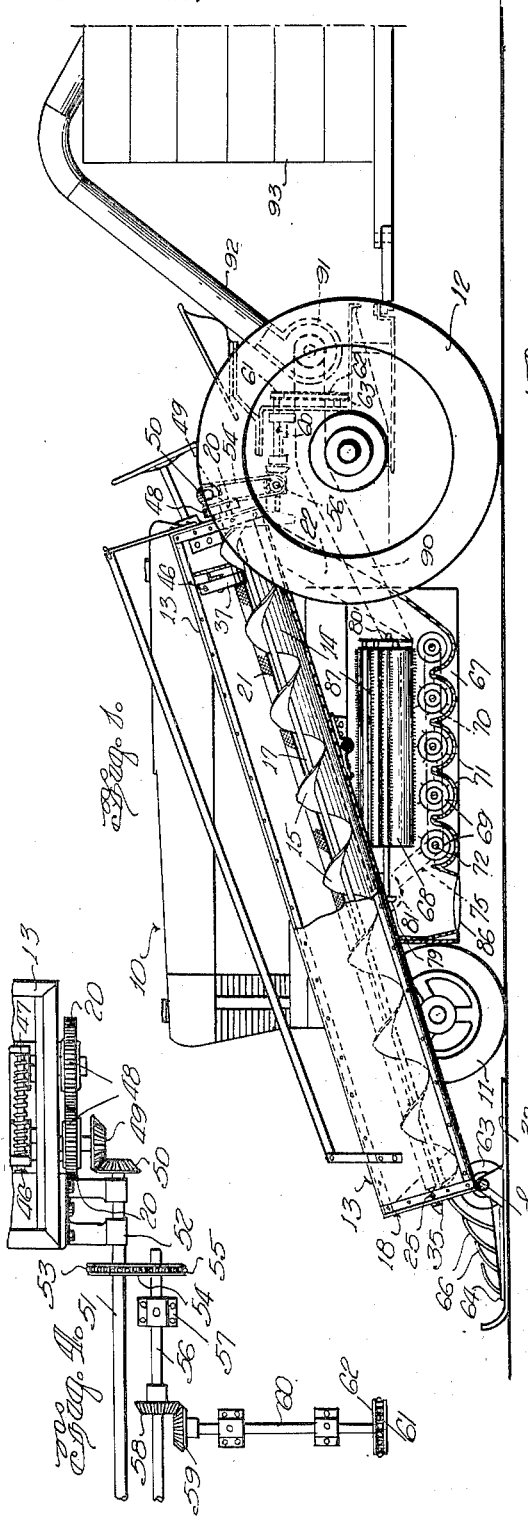
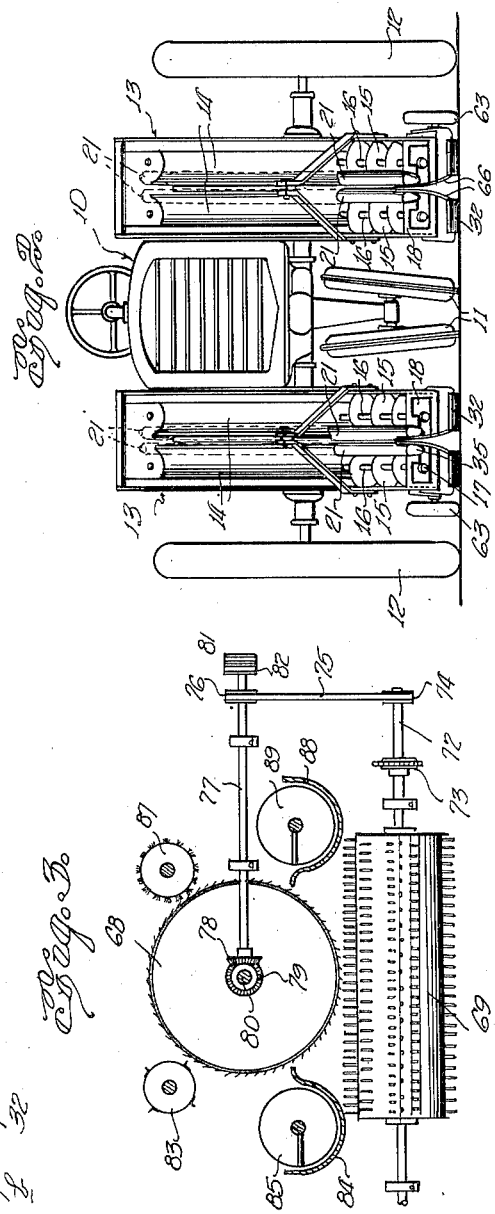
WILLIAM N. SMITH
INVENTOR.

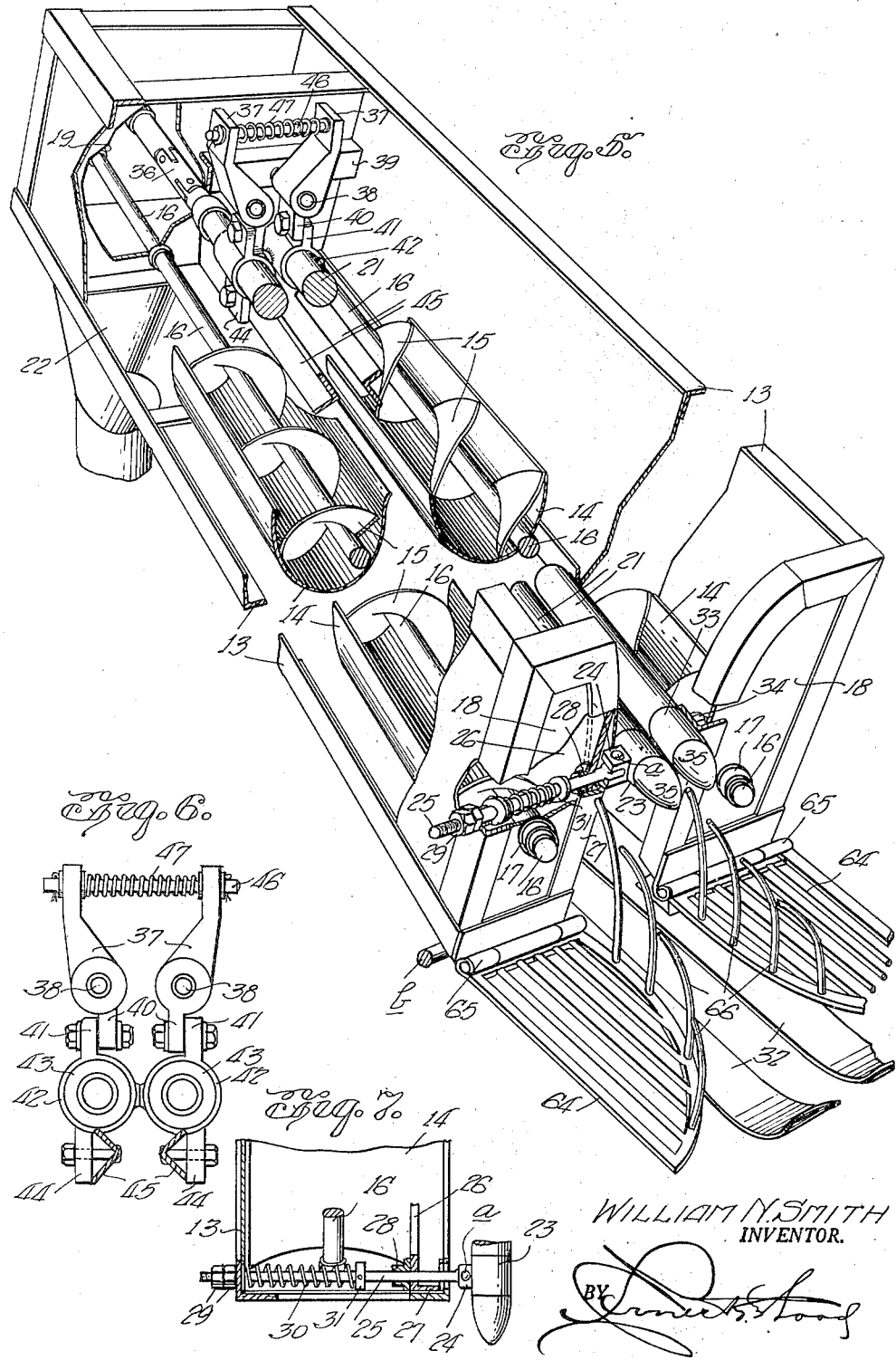

Patented Dec. 20, 1949

2,491,777

UNITED STATES PATENT OFFICE 2,491,777

STRIPPER TYPE COTTON HARVESTER

William N. Smith, Dallas, Tex.

Application December 26, 1944, Serial No. 569,705

3 Claims. (Cl. 56—33)

This invention relates to cotton harvesting machines and it has particular reference to a combination cotton stripping and cleaning machine.

Cotton stripping machines designed to divest the stalks in the field of all open bolls have long been used in certain cotton raising regions, chiefly in sections where the climatic conditions are such that the stalks do not attain great height and produce a minimum of foliage. Machines for this purpose have been constructed with various types of mechanisms for removing the cotton from the stalk and conveying it to a point of disposal. Included among such mechanisms are inclined, cooperating rollers which have been found to harvest the cotton with but a minimum amount of leaves, sticks, et cetera and cooperating with these rollers are flight conveyors, disposed in troughs on each side of the pair of rollers.

It is the principal object of the present invention to provide a cotton stripping machine employing parallel, closely related rollers, disposed on an inclined plane, combined with flight conveyors for carrying the material upwardly to a point of disposal, but in assembling these elements in a frame to be borne by a farm tractor, consideration is given to their effect in stripping stalks of greater height and more abundant in fruit and foliage than cotton grown in drier climates.

Several factors present themselves in designing a machine for stripping tall stalks of cotton. First, the entire stripping assembly must be lengthened and elevated at the rear to accommodate the taller stalks. The capacity of the machine must be increased. Provision must be made to permit at least one of the stripping rollers to yield to stalk to minimize breakage of the limbs and branches to reduce the quantity of useless material stripped with the cotton and above all, provision against uprooting of stalks must be made.

The present invention seeks among its objects to provide an elongated stripping frame having all of the prerequisites above outlined, including shoes adapted to slidably engage the soil on each side of the stalk to prevent uprooting thereof and oscillatable vertically to adapt themselves to irregularities of terrain; also a novel means for constraining one of the stripping rollers to yield to the other at each end. Moreover, the invention provides a scraping element to prevent foreign matter to adhere to or wind itself about the rollers to reduce their efficiency.

Another object of the invention is to provide a pre-cleaning assembly, receiving material from the conveyors of the strippers, to remove the major part of trash from the cotton before finally discharging the latter by blowers into a conveyance trailed behind the tractor, while the trash is deposited onto the ground directly from the cleaning assembly.

With the foregoing objects as paramount, the invention has further reference to certain features of accomplishment which will become apparent as the description proceeds, taken in connection with the accompanying drawings wherein:

Figure 1 is a side elevational view of a combined harvesting and cleaning machine constructed according to the invention, shown mounted on a tractor.

Figure 2 is a front elevational view.

Figure 3 is a schematic view of the cleaning assembly operating in conjunction with the stripper.

Figure 4 is a fragmentary plan view of the driving assembly for the stripping rollers and cooperating flight conveyors.

Figure 5 is a perspective view of one of the stripping units, centrally broken to denote elongation.

Figure 6 is a front elevational view of the top bearing assembly for the stripping rollers, and Figure 7 is a fragmentary plan view of a stripping unit at its forward end, showing the front roller bearing to effect yieldability of one of the rollers.

Continuing with a more detailed description of the drawing, reference is made primarily to Figure 1 wherein 10 denotes a tractor having front and rear wheels 11 and 12 respectively.

Each of the two stripping units of the machine, which are disposed one on each side of the tractor in inclined position, as shown, consists of a frame 13 whose side walls are closed but except for the concaved conveyor bottoms 14, the frame is open at the bottom from one end to the other so that cotton stalks may be passed therethrough. Flight conveyors 15 are rotatably mounted in the troughs or bottoms 14 with the shafts 16 journaled at their lower ends in bearings 17 in the ends 18 of frames 13. The upper or rear ends of the conveyor shafts, after passing through bearings 19 (Figure 5) emerge from the rear end of the frame and receive gears 20 (Figures 1 and 4).

Disposed above the conveyors 15 and parallel therewith are rollers 21, which are arranged relatively close together so that they will frictionally engage cotton stalks passing therebetween as the machine is moved along a row of stalks and since the rollers are caused to rotate in counter directions, the cotton along with some leaves, burs and the like, is rolled off the stalk into the conveyors 15 alongside the roller assembly. The conveyors 15 move the material extracted by the rollers upwardly and deposit the same into the chute 22 at the upper end of the frame 13, through which the cotton and attendant trash is transported to the cleaning assembly, shown in Figures 1 and 3 and to which further and more particular reference will be made presently.

Inasmuch as the rollers are required to yield to the stalks entering therebetween, a form of upper and lower bearings is provided which permits one roller to yield laterally with respect to the other at each end of the assembly. In Figures 5 and 7, the front bearing assembly is shown which consists of a collar 23, rotatably mounted adjacent the end of one of the rollers 21 and formed on this collar is a pair of ears 24, apertured to receive a pin a which passes through an aperture in the end of a rod 25, extending laterally towards one side of the frame 13.

To afford a support for the rod 25 adjacent the roller to which it is attached, a plate 26 is affixed to the innermost flange of the angle 27 constituting a part of the frame 13 and this plate is provided with an opening to receive a bearing 28, through which the rod 25 passes and in which it is adapted to reciprocate. The rod 25 continues through one side of the frame 13 and carries lock nuts 29, adjustment of which determines the degree of longitudinal movement of the rod 25.

To return the displaceable roller to properly spaced relationship with the companion roller when moved as by a stalk passing between the rollers, a compression spring 30 surrounds the rod 25 and bears at the outer end against the inner surface of the frame wall and at its inner end against a collar 31.

It is apparent from the foregoing that the provision for varying the spacing between the rollers will insure against uprooting of the stalks as they are acted upon by the rollers.

However, should stalks be encountered having unusually dense foliage or if for some reason the rollers tend to uproot the stalks regardless of the foregoing provision, a pair of relatively spaced and elongated skids or shoes 32 are mounted on shafts b disposed on the underside of the frame near its front. The shafts b afford transverse pivotal points for the skids 32 so that the latter may be capable of independent oscillation to follow irregularities in the soil but these skids bear firmly against the surface of the ground above the roots of the stalks of cotton and due to the length of the skids, the pressure is maintained as long as any part of the stalk remains between the rollers 21. Accordingly, there is little likelihood of uprooting even the shallowest stalk. It is obvious that the skids may be made in any form so long as the function thereof is the same, that is, to impose continuous downward pressure on the soil adjacent the roots of the cotton stalks as long as the stalks are subjected to the action of the stripping rollers.

It will be observed in Figure 5 that while one roller 21 is movable laterally at its forward end, the companion roller is stationarily mounted but rotatable in a collar 33, which is anchored by means of a bolt and nut 34 in the part of the frame 13 confronting that part which supports the companion roller 21. Each of the rollers 21 has a deflecting end member 35 to facilitate passage through the stalks.

At some point intermediate the ends of the rollers 21, preferably adjacent their rear ends, as shown in Figure 5, there is provided a universal joint 36. The purpose of this universal joint is to allow for relative lateral movement of the rollers 21, yet maintaining fixed spacing thereof at their driven ends, which is effected in a manner to be explained presently.

The mechanism which permits relative lateral displacement of the rollers at their rear ends is shown in Figures 5 and 6 and this mechanism also serves as a bearing for the rollers. A pair of confronting roller arms 37 are mounted on axes 38, journaled in bearings in a cross member 39 (Figure 5). The arms 37 have downwardly extending projections 40 to which are bolted projections 41 on collars 42 and which collars carrying bearings 43 (Figure 6) which receive the rollers 21. Depending from the collars 42 are projections 44. To these latter projections are bolted the upper ends of angles 45, so disposed that a flange of each will scrapingly engage the undersurface of a roller 21, thereby keeping the rollers free of any foreign matter having a tendency to cling thereto or become wound thereon. These angles or scrapers 45 extend from one end of the rollers to the other.

Returning to the rocker arm assembly, it will be observed that a rod 46 is loosely mounted at each end in holes provided in the upper ends of the rocker arms 37 and arranged thereon is a compression spring 47 whose purpose is to apply a continuous force against the arms, tending to resist outward movements of the rollers with respect to each other.

Returning to the driving means for the rollers, reference is again made to Figures 1 and 4. A gear 48 is mounted on the extended end of each roller shaft, immediately above the gears 20 which are mounted on the conveyor shafts 16 and gears 48 are enmeshed with gears 20. One of the roller shafts carries a beveled gear 49 which engages a beveled gear 50 on a lateral shaft 51 (Figure 4) journaled in bearings 52 mounted on the end of the frame 13. The shaft 51 carries a sprocket wheel 53, surrounding which is a chain 54, which drives a sprocket 55 on another transverse shaft 56. The shaft 56 extends across the transmission housing of the tractor (Figure 1) and drives the stripping unit on the opposite side of the tractor in the same manner as above described. This shaft is journaled in bearings 57.

The shaft 56 carries a beveled gear 58 which engages a similar gear 59 on the end of a shaft 60, mounted upon and parallel with the tractor transmission housing. The rearmost end of the shaft 60 carries a sprocket wheel 61 which is driven by a chain 62, surrounding a sprocket on the power take-off shaft of the tractor immediately below the sprocket 61.

As the tractor is driven along the row of cotton, the shoes or skids 32 are caused to straddle the stand of stalks and the small wheels 63, optionally provided to partially support the forward ends of the stripping units, travel in the furrows. Overlying the skids 32 are guards 64, consisting of open, curved frames containing relatively parallel rods and which frames are pivoted or hinged at 65 to the forward end of the unit in the manner shown in Figure 5. Rising from the curved inner edges of each frame are rearwardly curved fingers 66, becoming longer towards the end of the frame. It is the purpose of these fingers to direct stalks of cotton between the rollers 21. It is clearly apparent that the operation of extracting or rolling cotton from the stalks as they pass between the rollers 21 without imposing undue upward exertion on the stalks, is likely to uproot them. To insure against this, the shoes or skids serve to apply a counter pressure against any that may be exerted by the rollers 21.

Referring now to the cleaning assembly, it will be noted in Figure 1 that the casings 67 of each unit are suspended below the unit and that the overall width of the casing is not greater than the width of the frame 13 of the unit.

Within each casing is mounted a large impaling drum 68, diagrammatically shown in Figure 3, and the axis of this drum is parallel with the longitudinal axis of the casing 67. Below and in transverse relationship with the axis of the drum 68 is a group of relatively parallel, spiked beater rolls 69, mounted on independent axes but collectively rotated by means of a chain 70 shown in dotted lines in Figure 1. The rolls 69 operate over conventional foraminous concaves 71 in the customary manner.

The shaft 72 of the most forwardly situated rolls 69 is elongated as shown in Figure 3 and carries a sprocket wheel 73, over which the chain 70 travels to drive the companion rolls and on the end of the shaft 72 is mounted a pulley 74. A belt 75 connects this pulley with a pulley 76 on a lateral shaft 77 and this shaft, in turn, carries a beveled gear 78, meshing with a beveled gear 79 on the shaft 80 of the drum 68. On the opposite end of shaft 77 is mounted a pulley 81, over which operates a belt 82, driven from the side power take-off of the tractor 10. Since such a drive is common, it is not shown in the drawing.

As the material stripped from the stalks by the stripping rollers 21 is deposited into the chute 22 it is received by the rearmost of the several concaves 71 and is propelled from one to the other of these concaves by the rotating rolls 69 operating therein. As the material is thus moved the length of the beater assembly, it is constantly being projected upwardly against the toothed surface of the impaling or picker drum 68.

Mounted in an appropriate position alongside the drum 68 is a stripper roll 83 which strips from the impaled cotton the attendant leaves and other trash, depositing this material into the trough 84 of the flight conveyor 85 immediately below and coaxial with the stripper roll. The conveyor 85 moves the stripped material towards the end of the casing and through a discharge opening 86 (Fig. 1) onto the ground where it properly serves to enrich the soil, as does the residue of material, containing a minimum of cotton, discharged from the beater assembly after traveling the length of the drum 68. This latter material also is discharged through the opening 86.

On the side of the drum 68, opposite the stripper roll 83 is a doffing roll or brush 87. It is the purpose of this brush to remove from the drum 68, the impaled cotton and deposit into the trough 88, whose conveyor 89 moves the material received by the trough 88 in a direction counter to that of conveyor 85 or, in other words, to the rear of the casing 67 where it is caught up by suction in conduit 90 (Figure 1) created by the blower 91, and conveyed through conduit 92 into a trailer 93 for transportation to a gin or storage.

No claim is herein made to novelty in the precleaning assembly shown and described, nor in the combination of a stripper and cleaner, since the mechanism of the cleaner and the combination are known to be old. However, the invention does claim as new, certain features of the stripper per se, including the pressure skids 32, the novel mounting of the stripping rollers 21 and the like.

Manifestly, the construction as shown and described is capable of some modification and such modification as may be construed to fall within the scope and meaning of the appended claims is also considered to be within the spirit and intent of the invention.

What is claimed is:

1. In a cotton harvesting machine, an inclined frame, a wheeled support for the lower end of said frame, a pair of co-extensive rollers rotatably disposed longitudinally in said frame, each having a universal joint adjacent an end thereof, a pair of angular arms mounted in said frame for pivotal movement, a protuberance on the lower end of each of said arms, a bearing attached to each of said protuberances, said bearings receiving said rollers, spring means normally urging the upper ends of said arms apart to yieldingly hold said rollers in juxtaposition, a stationary bearing for the lower end of one of said rollers, a movable bearing for the other of said rollers, an angle member underlying and in physical contact with each of said rollers for scraping the same and means at the lower end of said frame for slidingly engaging the soil to prohibit uprooting of stalks of cotton as the foliage thereof passes between said rollers.

2. In a cotton harvesting machine, an inclined frame, a pair of rollers rotatably disposed in parallelism longitudinally in said frame and between which stalks of cotton are constrained to pass for stripping, an angle iron affixed below the effective length of each of said rollers having one flange in scraping engagement with a roller, a pair of arms pivoted in said frame, a bearing suspended from the lower end of each of said arms, said bearings receiving said rollers, a spring normally urging the upper ends of said arms apart to dispose said rollers yieldingly in juxtaposition, means holding the lower end of one of said rollers against other than rotation, means to effect limited lateral displacement of the lower end of the other of said rollers with respect to its companion, a flight conveyor on each side of said pair of rollers, a bottom therefor and ground engaging means at the lower end of said frame to prohibit uprooting of cotton stalks as they pass between said rollers.

3. In a cotton harvesting machine, an inclined frame, parallel rollers co-extensive with said frame, a universal joint in each of said rollers adjacent the upper end thereof, a bearing on each roller adjacent its upper end, a pair of pivoted arms, each having a protuberance supporting a bearing of said rollers, a spring normally urging the upper ends of said arms apart to yieldingly hold said rollers together, a stationary bearing for the lower end of one of said rollers, a movable bearing for the lower end of the companion roller, a flight conveyor on each side of said pair of rollers for receiving the discharge thereof, a bottom for each of said flight conveyors, means under and in engagement with each of said rollers for removing foreign matter therefrom and means at the forward end of said frame for slidingly engaging the ground to prohibit uprooting of stalks of cotton passing between said rollers.

WILLIAM N. SMITH.

REFERENCES CITED

The following references are of record in the file of this patent:

UNITED STATES PATENTS

| Number | Name | Date |
|---|---|---|
| 1,695,902 | Sandifur | Dec. 18, 1928 |
| 1,769,104 | Benjamin | July 1, 1930 |
| 2,001,077 | Thomann | May 14, 1935 |
| 2,123,405 | Court | July 12, 1938 |
| 2,219,483 | Lukes | Oct. 29, 1940 |
| 2,334,945 | Mitchell et al. | Nov. 23, 1943 |
| 2,406,058 | Boone | Aug. 20, 1946 |